US012581547B2

(12) United States Patent
Narayanan et al.

(10) Patent No.: US 12,581,547 B2
(45) Date of Patent: Mar. 17, 2026

(54) WIRELESS CONNECTION BETWEEN A STREAMING DEVICE AND A WIRELESS COMMUNICATION DEVICE

(71) Applicant: ROKU, INC., San Jose, CA (US)

(72) Inventors: Karthick Narayanan, Cambridge (GB); Neena Mohanachandran Sailaja, Cambridge (GB); Jason Schmidlapp, San Jose, CA (US)

(73) Assignee: ROKU, INC., San Jose, CA (US)

( * ) Notice: Subject to any disclaimer, the term of this patent is extended or adjusted under 35 U.S.C. 154(b) by 259 days.

(21) Appl. No.: 18/205,275

(22) Filed: Jun. 2, 2023

(65) Prior Publication Data

US 2024/0407018 A1 Dec. 5, 2024

(51) Int. Cl.
*H04W 76/10* (2018.01)

(52) U.S. Cl.
CPC .................................. *H04W 76/10* (2018.02)

(58) Field of Classification Search
CPC ................................ H04W 76/10; H04W 4/80
See application file for complete search history.

(56) References Cited

U.S. PATENT DOCUMENTS

| | | | |
|---|---|---|---|
| 2015/0138097 A1* | 5/2015 | Yamada | G06F 3/04886 |
| | | | 345/172 |
| 2021/0083787 A1* | 3/2021 | Jain | H04N 21/6112 |

* cited by examiner

*Primary Examiner* — Tuan H Nguyen
(74) *Attorney, Agent, or Firm* — STERNE, KESSLER, GOLDSTEIN & FOX P.L.L.C.

(57) ABSTRACT

Disclosed herein are system, apparatus, article of manufacture, method and/or computer program product embodiments, and/or combinations and sub-combinations thereof for establishing a streaming channel between a wireless communication device and a streaming device through a proximity device. The streaming device can initialize a network driver, and establish a first connection with a proximity device. Afterwards, the streaming device can retrieve, from the proximity device, a list of available wireless channels to communicate with the wireless communication device, where the list of available wireless channels is stored on the proximity device and selected from a list of wireless channels provided by the wireless communication device. The streaming device can further establish a second connection by the streaming device with the wireless communication device through a streaming channel selected from the list of available wireless channels.

20 Claims, 4 Drawing Sheets

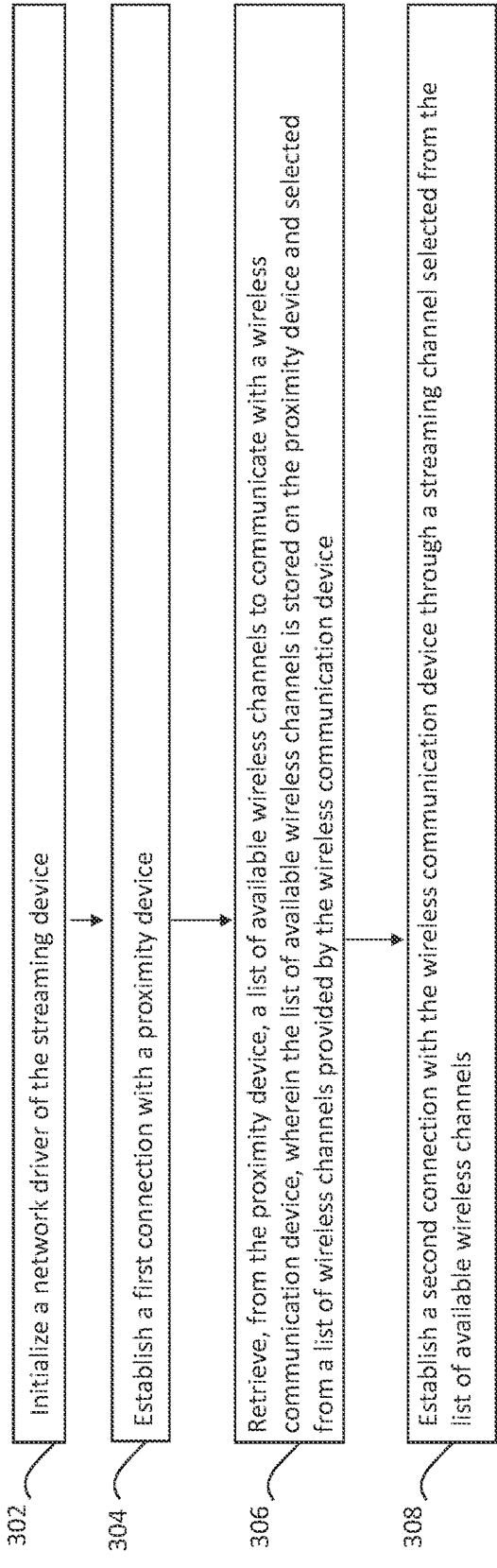

300

302  Initialize a network driver of the streaming device

304  Establish a first connection with a proximity device

306  Retrieve, from the proximity device, a list of available wireless channels to communicate with a wireless communication device, wherein the list of available wireless channels is stored on the proximity device and selected from a list of wireless channels provided by the wireless communication device 308  Establish a second connection with the wireless communication device through a streaming channel selected from the list of available wireless channels

FIG. 3

WIRELESS CONNECTION BETWEEN A STREAMING DEVICE AND A WIRELESS COMMUNICATION DEVICE

BACKGROUND

Field

This disclosure is generally directed to playing media content in a multimedia environment including playing media content based on a wireless connection for a streaming device.

Background

Traditionally, television (TV) offers viewers access to content, which may be TV content or multimedia content, via subscription to cable or satellite services or through over-the-air broadcasts. In general, content can be delivered from a content source device operated by a content provider to millions of viewers to be displayed by TV devices. TV content has been offered to the viewers in a linear way in which viewers can only consume the content and watch programs according to a broadcaster programming schedule.

With the advanced technology, TV content or multimedia content such as movies can be delivered via the Internet or other channels to various media devices in a live stream format without the involvement of cable or satellite service providers. For example, TV content or multimedia content delivered in such stream format can be provided by over-the-top television (OTT) or free ad-supported streaming (FAST) TV. With the content delivered in stream format by a streaming device, viewers can have many choices on what content items to watch. However, the efficiency for a streaming device to deliver media content can still be improved. In particular, when the connection between a streaming device and a communication device is a wireless connection, it has some special challenges to speed up the process to establish such a wireless connection.

SUMMARY

Provided herein are system, apparatus, article of manufacture, method and/or computer program product embodiments, and/or combinations and sub-combinations thereof, for a process that efficiently establishes a streaming channel between a wireless communication device and a streaming device using a proximity device to speed up the process.

In some aspects, a method for establishing a streaming channel between a wireless communication device and a streaming device through a proximity device is presented. The streaming device can be a plug-and-play device that is coupled to a display device by a plug-and-play communication interface, and the plug-and-play communication interface can include a universal serial bus (USB) interface or a High-Definition Multimedia Interface (HDMI). In some aspects, the wireless communication device can be a Wi-Fi® access point or a Wi-Fi® router, and can provide a list of wireless channels such as 12 channels.

In some aspects, the method can include initializing by the streaming device a network driver of the streaming device, and establishing a first connection with a proximity device. Afterwards, the method can include retrieving, from the proximity device, a list of available wireless channels to communicate with the wireless communication device, where the list of available wireless channels is stored on the proximity device and selected from a list of wireless channels provided by the wireless communication device. In some aspects, the list of available wireless channels is determined by the proximity device within a predetermined time duration before powering on the streaming device.

In some aspects, the proximity device can be a remote control, the first connection can be established through a default peer-to-peer wireless communication channel between the streaming device and the remote control. In some aspects, the proximity device can be a computing device having an application installed to act as a remote control for the streaming device. In some aspects, the proximity device can be a display device coupled to the streaming device by a plug-and-play communication interface, the first connection with the proximity device can be established through the plug-and-play communication interface, and the streaming device can retrieve the list of available wireless channels from the display device through the plug-and-play communication interface.

In some aspects, the method can further include establishing a second connection by the streaming device with the wireless communication device through a streaming channel selected from the list of available wireless channels. Accordingly, the second connection with the wireless communication device can be established by avoiding scanning by the streaming device the list of wireless channels provided by the wireless communication device, hence speeding up the process of establishing the second connection.

In some aspects, the method can further include receiving media content from a content server through the streaming channel provided by the wireless communication device, and further providing the media content to a display device to be displayed by the display device.

In some aspects, the method can further include connecting the streaming device to a display device by a plug-and-play communication interface, and receiving a signal indicating a button of the streaming device being pressed to switch on the streaming device by power provided from the display device through the plug-and-play communication interface.

BRIEF DESCRIPTION OF THE FIGURES

The accompanying drawings are incorporated herein and form a part of the specification.

FIG. 3 is a flowchart illustrating an example process for establishing a streaming channel between a wireless communication device and a streaming device by using a proximity device, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
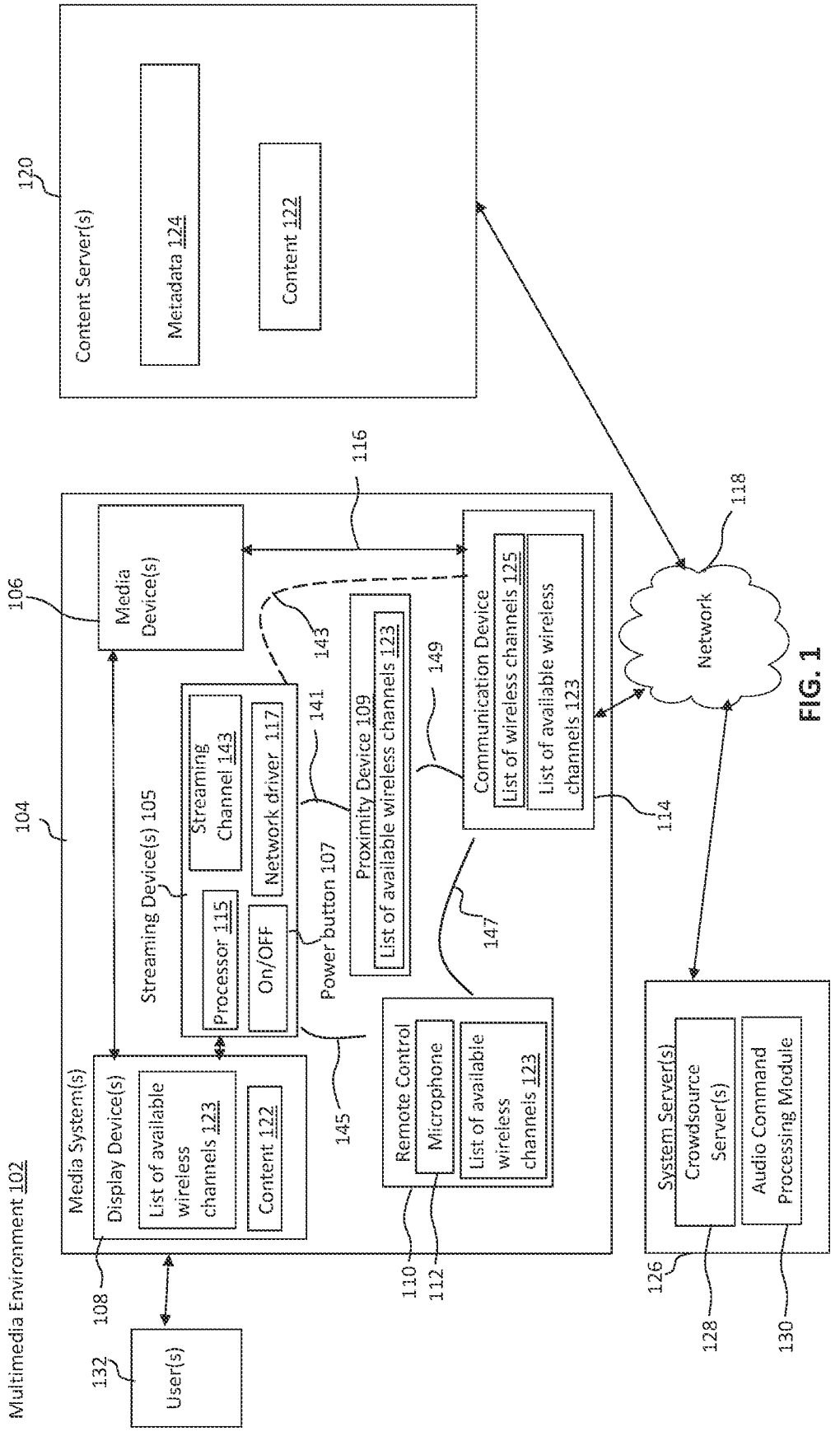
FIG. 1 illustrates a block diagram of a multimedia environment, according to some embodiments.

Provided herein are system, apparatus, device, method and/or computer program product embodiments, and/or combinations and sub-combinations thereof, for establishing a streaming channel between a wireless communication device and a streaming device using a proximity device.

In some aspects, a streaming device can be known as a media streaming device, a computing device, or a streaming stick, which allows a user to stream media content such as movies, television (TV) shows, music, or photos to a media device or a display device, such as a TV, usually via a plug-and-play communication interface, such as a High-Definition Multimedia Interface (HDMI) port or a universal serial bus (USB) port on the back of TV. In some aspects, a streaming device can be a small computer dedicated to streaming media content through TV using internet connection via Ethernet or a wireless connection such as Wi-Fi®. In some descriptions, Wi-Fi® can be referred to as wifi, WiFi, Wi-Fi, or some other forms known to a person of ordinary skills in the art. In some aspects, Wi-Fi® may be used as an example of any wireless local area network (WLAN), and it can be replaced by another WLAN technology. Explicitly designed with streaming in mind, operating systems for a streaming device can be limited to offering apps relevant to screaming media contents. Apps operating on a steaming device can include Netflix®, Disney+®, Amazon Prime Video®, Hulu®, and other popular streaming services.

In some aspects, a wireless communication device can be coupled to a streaming device to form a wireless network, where media content from a content server can be delivered through a streaming channel between the streaming device and the wireless communication device. A wireless communication device can be a network device performing network functions, such as a wireless access point, or a wireless router. A wireless communication device can be designed according to some wireless standard to communicate on a set of wireless channels. A streaming channel can be selected from a list of wireless channels provided or supported by the wireless communication device.

In some aspects, when a wireless communication device is designed, it can operate on a list of wireless channels according to some default design or wireless communication standard. For example, for the wi-fi wireless standard, a wi-fi channel can be a frequency at which a wi-fi router sends out information to other devices such as the streaming device. In some aspects, a wi-fi channel can be a smaller band within the wi-fi frequency band that are used by the wireless network to send and receive data. A wireless router can support several bands for the wi-fi wireless network, most popular being 5 GHz and 2.4 GHz. Each of these band ranges can be divided into smaller slots that are channels or wireless channels. For example, there can be 12 wi-fi channels in the 2.4 GHz frequency band and 45 wi-fi channels are in the 5 GHz frequency band.

In some aspects, while the wireless communication device can operate in the list of wireless channels designed for the wireless communication device at the time of manufacturing, often the wireless communication device can be configured or setup by selecting only a subset of wireless channels from the list of wireless channels supported by the wireless communication device. Those selected subset of wireless channels for the wireless communication device can be referred to as a list of available wireless channels to communicate with the wireless communication device. Selecting one or more of these available wireless channels can be an important part of setting up the wireless network. In some examples, if a wireless router is on the same wi-fi channel as a neighbor wireless router, the wireless router may experience a large amount of interferences with their networks. Currently, a wireless router can automatically select the list of available wireless channels upon initial setup from a list of wireless channels supported by the wireless communication device. Communication on the selected list of available wireless channels can reduce the interference and improve wi-fi signal quality. Accordingly, when a streaming device communicates with a wireless communication device such as a wi-fi router or a wireless access point, the streaming device may need to know the list of available wireless channels the wireless communication device is setup for, where the list of available wireless channels is a subset, which may be smaller than the list of wireless channels supported or provided by the wireless communication device.

In some aspects, when a streaming device, such as a USB streaming stick, is connected through a TV USB port, the streaming device can wait for a power button being pressed to switch on. Afterwards, the streaming device can perform a sequence of operations to connect to a network and display a home screen. Many other operations can be performed that are dependent on network connectivity, such as updating plug-ins, registering for multiple services, uploading core etc. For a wireless network to be established, the network application may be started on the streaming device, and the network may initialize its driver. Afterwards, the streaming device can initiate a channel scan to search for the list of available wireless channels to communicate with the wireless communication device. In some aspects, such a channel scan can take at least 4 seconds or more. Saving the 4+ seconds used in the channel scan by the streaming device can provide a better overall user experience for the streaming device.

In some aspects, the streaming device can be powered on by pressing a button from a remote control, which may be referred to as an example of a proximity device. The remote control can perform a channel scan operation or a scan operation on all wi-fi channels for the wireless network that the streaming device would potentially connect to, which may determine the list of available wireless channels to communicate with a wireless communication device. The remote control can save the list of available wireless channels in the remote control. When a wi-fi network is initialized on the streaming device, the remote control can transfer the list of available wireless channels to communicate with a wireless communication device to the streaming device, by a peer-to-peer connection between the remote control and the streaming device. Therefore, the streaming device can skip the channel scan operation to determine the list of available wireless channels to communicate with the wireless communication device, and directly probe only the channels of the list of available wireless channels to find a streaming channel. In some aspects, there may be only 1 or 2 channels in the list of available wireless channels to communicate with the wireless communication device. Accordingly, the wireless network between the streaming device and the wireless communication device can be setup in a reduced time to avoid scanning by the streaming device the list of wireless channels provided by the wireless communication device. Accordingly, services dependent on network can be initialized more quickly.

In some aspects, the remote control is only an example of a proximity device, which can perform the channel scanning to determine the list of available wireless channels to communicate with the wireless communication device. For example, a wi-fi remote control can perform the channel scanning by pressing a button of the remote control. The proximity device can save the scan time for the streaming device when the streaming device is booted to start. Embodiments herein can be applied to any USB powered streaming stick with a Wi-Fi® remote control.

Embodiments herein provide a mechanism for efficiently establishing a streaming channel between a wireless communication device and a streaming device using a proximity device to speed up the process. Embodiments can involve initializing by the streaming device a network driver of the streaming device, and establishing a first connection with a proximity device such as a remote control. Afterwards, the streaming device can retrieve, from the proximity device, a list of available wireless channels to communicate with the wireless communication device, where the list of available wireless channels is stored on the proximity device and selected from a list of wireless channels provided by the wireless communication device. In some aspects, the list of available wireless channels is determined by the proximity device within a predetermined time duration before powering on the streaming device.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. Users 132 may operate with the media system 104 to select and consume content, such as media content 122, which may also be referred to as a content item.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some aspects, media device 106 can be a part of, integrated with, operatively coupled to, and/or connected to its respective display device 108.

Each media device 106 may be configured to communicate with network 118 via a communication device 114. The communication device 114 may include, for example, a cable modem, a cellular modem, a Wi-Fi® modem, any other wireless modem, or satellite TV transceiver. The media device 106 may communicate with the communication device 114 over a link 116, wherein the link 116 may include wireless (such as Wi-Fi®) and/or wired connections. In some aspects, communication device 114 may be a wireless communication device that can perform wireless network functions. In some aspects, a streaming device 105 may be an example of media device 106. Streaming device 105 may be a plug-and-play device that is coupled to display device 108 by a plug-and-play communication interface. Details of the operations performed by streaming device 105 can be described in subsequent paragraphs.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below. In some aspects, a proximity device 109 may be a computing device having an application installed to act as a remote control for streaming device 105.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include multiple content items, which may be any combination of music, videos, movies, TV programs, multimedia, images, still pictures, text, graphics, gaming applications, advertisements, programming content, public service content, government content, local community content, software, and/or any other content or data objects in electronic form.

In some aspects, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index. In some aspects, content server 120 and media device 106 may work together to play content 122 based on metadata 124.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming of the movie.

The system servers 126 may also include an audio command processing module 130. As noted above, the remote control 110 may include a microphone 112. The microphone 112 may receive audio data from users 132 (as well as other sources, such as the display device 108). In some aspects, the media device 106 may be audio responsive, and the audio data may represent verbal commands from the user 132 to control the media device 106 as well as other components in the media system 104, such as the display device 108.

In some aspects, the audio data received by the microphone 112 in the remote control 110 is transferred to the media device 106, which is then forwarded to the audio command processing module 130 in the system servers 126. The audio command processing module 130 may operate to process and analyze the received audio data to recognize the verbal command of user 132. The audio command processing module 130 may then forward the verbal command back to the media device 106 for processing.

Figure 2:
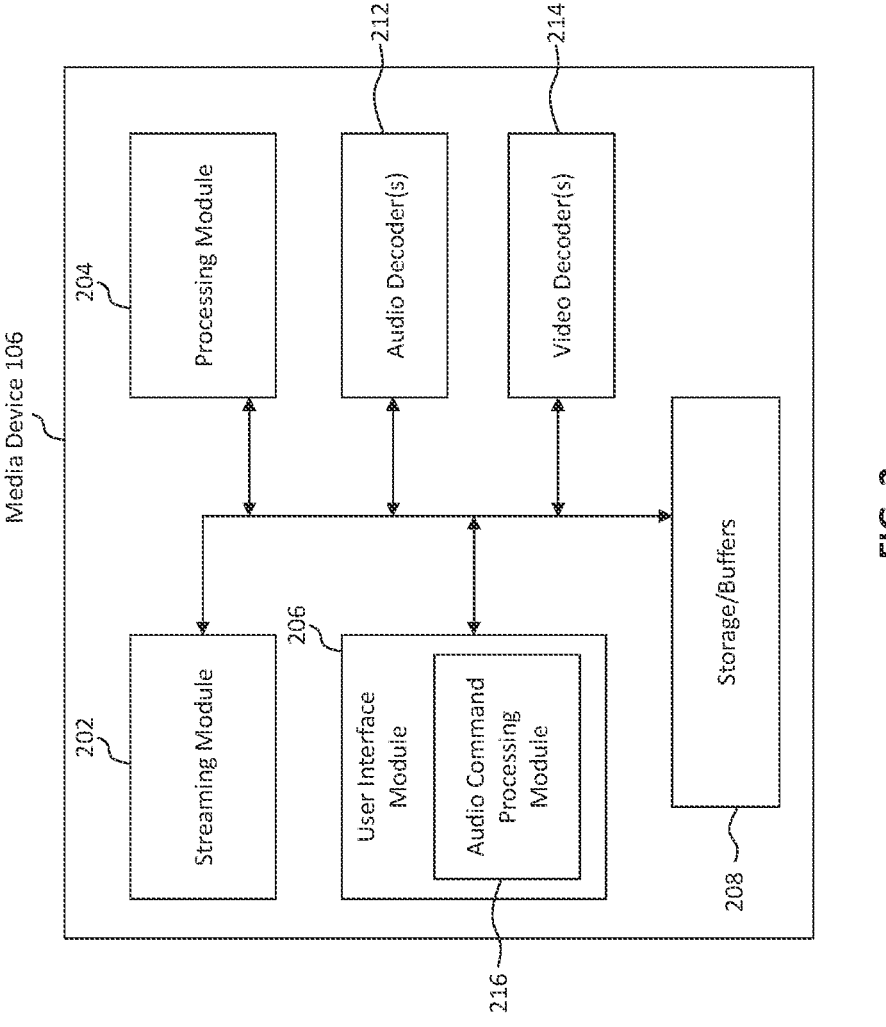
FIG. 2 illustrates a block diagram of a streaming media device, according to some embodiments.

In some aspects, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, H.265, AVI, and/or XDCAM EX, to name just some examples.

Now referring to both FIGS. 1 and 2, In some aspects, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Wireless Connection Between a Wireless Communication Device and a Streaming Device.

Referring back to FIG. 1, where streaming device 105 may be an example of media device 106, which can be implemented similarly as shown in FIG. 2. Streaming device 105 can perform operations to establish a streaming channel between a wireless communication device, e.g., communication device 114, and streaming device 105 using proximity device 109, display device 108, or remote control 110 to speed up the process. Conventional way for establishing such a wireless streaming channel can involve a long channel scanning process by streaming device 105.

Streaming device 105 initializes a network driver, and establish a first connection with a proximity device. Afterwards, streaming device 105 retrieves, from proximity device 109, a list of available wireless channels 123 to communicate with the wireless communication device, where the list of available wireless channels 123 is stored on proximity device 109 and selected from a list of wireless channels 125 provided by the wireless communication device. Streaming device 105 further establishes a second connection by streaming device 105 with the wireless communication device through a streaming channel 143 selected from the list of available wireless channels 123.

Streaming device 105 can be a plug-and-play device that is coupled to display device 108 by a plug-and-play communication interface, and the plug-and-play communication interface can include a USB interface, a HDMI, or some other plug-and-play communication interface. Streaming device 105 can include one or more processors, such as a processor 115, and a power button 107. When power button 107 is pressed, stream device 105 can be powered on to start communication with display device 108. In some aspects, stream device 105 can receive a signal indicating a button of the streaming device being pressed to switch on streaming device 105 by power provided from display device 108 through the plug-and-play communication interface.

In some aspects, communication device 114 can be a Wi-Fi® access point or a Wi-Fi® router, or any other network device to transmit network traffic to the streaming device 105, and can provide a list of wireless channels such as 12 channels or 45 channels.

In some aspects, proximity device 109 can be remote control 110, or display device 108, or other computing device. For example, proximity device 109 can be a smart phone, an IPAD®, a tablet, a computer, a mobile station, with an application installed to function as a remote control or other functions.

In some aspects, streaming device 105 can initialize a network driver 117, and establish a connection 141 with proximity device 109, where proximity device 109 can communicate with communicate device 114 through a connection 149. In some aspects, when remote control 110 can communicate with communication device 114 through a connection 147, streaming device 105 can initialize a network driver, and establish a connection 145 with remote control 110. In some aspects, there may only have one or both of remote control 110 or proximity device 109 available. Similarly, display device 108 may be able to communicate with communication device 114 through a wireless communication connection, not shown.

In some aspects, proximity device 109 can establish connection 149 with communication device 114. When communication device 114 is manufactured by a manufacturer, it can support a list of wireless channels 125. Such a list of wireless channels 125 may be determined based on a wireless communication standard. When communication device 114 is purchased by a user and setup as part of media system 104, communication device 114 may select a list of available wireless channels 123, which can be a subset of and smaller than the list of wireless channels 125. For example, when communication device 114 is a Wi-Fi® router, the list of wireless channels 125 may include 12 channels, and the list of available wireless channels 123 may include only 3 channels, such as channels 1, 6, and 11. There can be multiple communication devices 114 that can support the same list of wireless channels 125 accordingly to the same wireless communication standard. However, each communication device 114 may have a different list of available wireless channels 123 to avoid channel overlap between neighboring communication devices. Accordingly, in order for stream device 105 to communicate with communication device 114, stream device 105 may perform a channel scan operation to detect or determine the list of available wireless channels 123. Such a channel scan performed by stream device 105 can be time consuming and affect the user experience in a negative way.

In some aspects, when proximity device 109 establishes connection 149 with communication device 114, proximity device 109 can perform a channel scan to determine the list of available wireless channels 123 for communication device 114, and further save the list of available wireless channels 123 into its storage. Since proximity device 109 may be powered on before streaming device 105, proximity device 109 may have the list of available wireless channels 123 saved when streaming device 105 is powered on. Once the connection 141 between streaming device 105 and proximity device 109 is established, streaming device 105 can retrieve the list of available wireless channels 123 from proximity device 109 without performing a channel scan by itself to determine the list of available wireless channels 123 for communication device 114. In some aspects, the list of available wireless channels 123 is determined by proximity device 109 within a predetermined time duration before powering on streaming device 105. For example, the list of available wireless channels 123 is determined by proximity device 109 within 3 minutes before powering on streaming device 105.

In some aspects, proximity device 109 can be a remote control, the connection 141 between proximity device 109 and streaming device 105 can be a first type wireless communication connection, which can be a default peer-to-peer wireless communication channel between streaming device 105 and proximity device 109. In some aspects, the proximity device can be a computing device having an application installed to act as a remote control for the streaming device. In some aspects, display device 108 can act as a proximity device, which is coupled to streaming device 105 by a plug-and-play communication interface. Accordingly, the connection with display device 108 can be established through the plug-and-play communication interface, and streaming device 105 can retrieve the list of available wireless channels 123 from the display device 108 through the plug-and-play communication interface.

In some aspects, streaming device 105 can establish a connection with the wireless communication device, such as communication device 114, through a streaming channel 143 selected from the list of available wireless channels 123. After retrieving the list of available wireless channels 123, streaming device 105 can select streaming channel 143 from the list of available wireless channels 123. Accordingly, the connection through streaming channel 143 with communication device 114 can be established by avoiding scanning by streaming device 105 the list of wireless channels 125 provided by communication device 114, which is a wireless communication device. In other words, streaming device 105 can establish the connection through streaming channel 143 with communication device 114 without performing a channel scanning of the list of wireless channels 125 provided by communication device 114, hence speeding up the process of establishing the connection with communication device 114.

In some aspects, streaming device 105 can receive media content 122 from content server 120 through streaming channel 143 provided by communication device 114, and further provide the media content 122 to display device 108 to be displayed by display device 108. In some aspects, streaming device 105 can start an operating system of the streaming device, start a network application for streaming device 105 before initializing the network driver.

FIG. 3 is a flowchart illustrating an example process 300 for establishing a streaming channel between a wireless communication device and a streaming device using a proximity device, according to some embodiments. Process 300 can be performed by processing logic that can comprise hardware (e.g., circuitry, dedicated logic, programmable logic, microcode, etc.), software (e.g., instructions executing on a processing device), or a combination thereof. In some aspects, process 300 may operate across multiple different computing devices simultaneously, or in parallel, thus reducing the amount of time that may be used for operations shown in process 300. It is to be appreciated that not all steps may be needed to perform the disclosure provided herein. Further, some of the steps may be performed simultaneously, or in a different order than shown in FIG. 3, as will be understood by a person of ordinary skill in the art. Process 300 are described with reference to FIGS. 1-2. However, process 300 is not limited to that example embodiment.

In step 302, streaming device 105 initializes network driver 117 of streaming device 105. Streaming device 105 may initialize network driver 117 after connecting streaming device 105 to display device 108 by a plug-and-play communication interface, and receiving a signal indicating a button of streaming device 105, such as power button 107, being pressed to switch on streaming device 105 by power provided from display device 108 through the plug-and-play communication interface.

In step 304, streaming device 105 establishes a first connection with proximity device 109, e.g., connection 141. The proximity device can be remote control 110, the first connection can be established through a default peer-to-peer wireless communication channel between streaming device 105 and remote control 110. The proximity device can be a computing device having an application installed to act as a remote control for streaming device 105. The proximity device can be display device 108 coupled to streaming device 105 by a plug-and-play communication interface, the first connection with the proximity device can be established through the plug-and-play communication interface.

In step 306, streaming device 105 retrieves, from proximity device 109, the list of available wireless channels 123 to communicate with a wireless communication device, e.g., communication device 114. The list of available wireless channels 123 can be stored on proximity device 109 and selected from a list of wireless channels 125 provided by the wireless communication device, e.g., communication device 114.

In step 308, streaming device 105 establishes a second connection with the wireless communication device through streaming channel 143 selected from the list of available wireless channels 123.

Example Computer System

Figure 4:
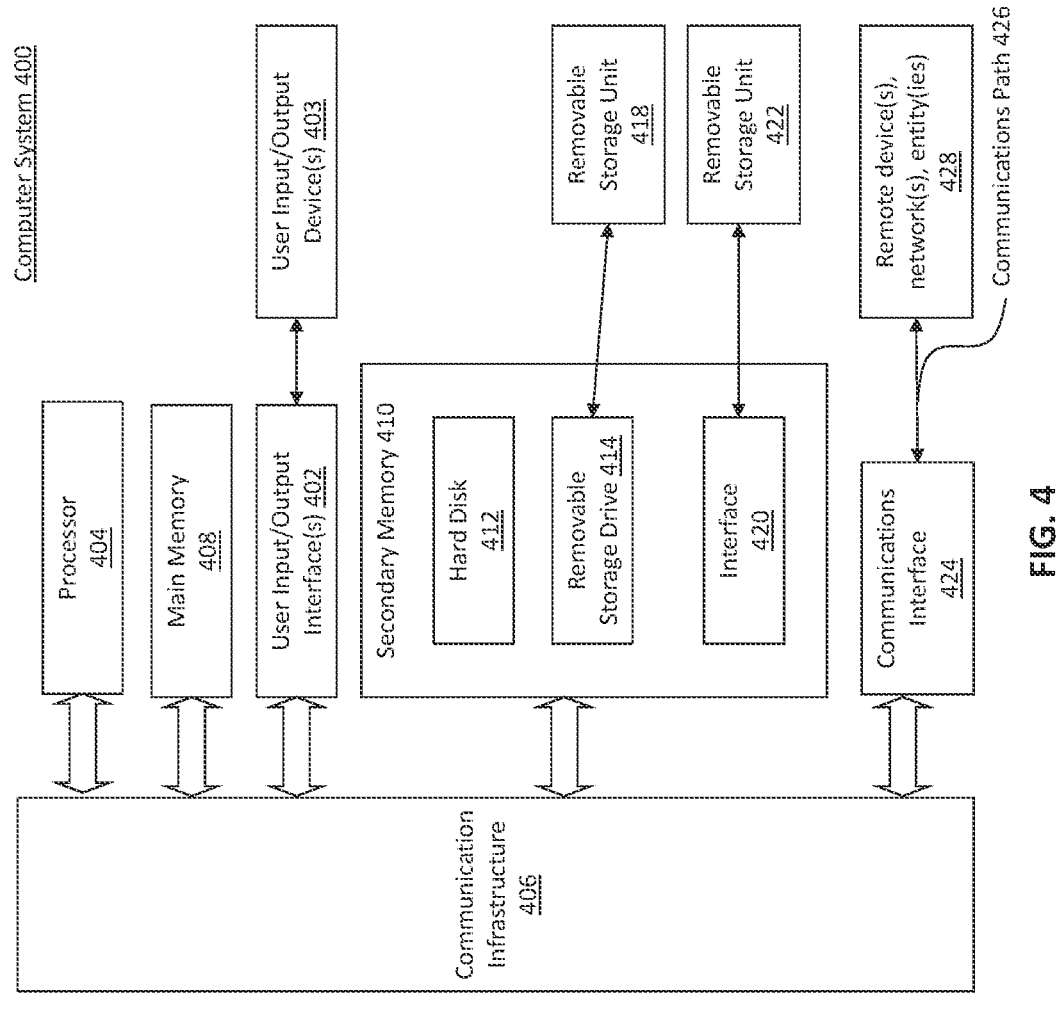
FIG. 4 illustrates an example computer system useful for implementing various embodiments.

Various embodiments may be implemented, for example, using one or more well-known computer systems, such as computer system 400 shown in FIG. 4. For example, media device 106, streaming device 105, display device 108, proximity device 109, content server 120, system server 126, may be implemented using combinations or sub-combinations of computer system 400 to perform various functions described herein, e.g., by process 300 performed by media device 106 or streaming device 105. Also or alternatively, one or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models, e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400 or processor(s) 404), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for operating a streaming device, comprising:

initializing, by at least one processor, a network driver of the streaming device;

establishing a first connection with a proximity device, wherein the proximity device is powered before the streaming device;

retrieving, from the proximity device, a list of available wireless channels to communicate with a wireless communication device, wherein the list of available wireless channels is stored on the proximity device and selected from a list of WiFi wireless channels provided by the wireless communication device; and establishing a second connection with the wireless communication device through a streaming channel selected from the list of available wireless channels.

2. The computer-implemented method of claim 1, wherein the establishing the second connection with the wireless communication device comprises establishing the second connection with the wireless communication device to avoid scanning, by the streaming device the list of wireless channels provided by the wireless communication device.

3. The computer-implemented method of claim 1, wherein the list of available wireless channels is determined by the proximity device within a predetermined time duration before powering on the streaming device.

4. The computer-implemented method of claim 1, further comprising:

receiving media content from a content server through the streaming channel provided by the wireless communication device; and providing the media content to a display device to be displayed by the display device.

5. The computer-implemented method of claim 1, wherein the streaming device is a plug-and-play device that is coupled to a display device by a plug-and-play communication interface.

6. The computer-implemented method of claim 5, wherein the plug-and-play communication interface includes a universal serial bus (USB) interface or a High-Definition Multimedia Interface (HDMI).

7. The computer-implemented method of claim 1, further comprising:

connecting the streaming device to a display device by a plug-and-play communication interface; and receiving a signal indicating a button of the streaming device being pressed to switch on the streaming device by power provided from the display device through the plug-and-play communication interface.

8. The computer-implemented method of claim 1, wherein the proximity device is a remote control, and the establishing the first connection comprises establishing the first connection through a default peer-to-peer wireless communication channel between the streaming device and the remote control.

9. The computer-implemented method of claim 1, wherein the proximity device is a computing device having an application installed to act as a remote control for the streaming device.

10. The computer-implemented method of claim 1, wherein the proximity device is a display device coupled to the streaming device by a plug-and-play communication interface, and wherein the establishing the first connection with the proximity device comprises:

establishing the first connection with the proximity device through the plug-and-play communication interface; and retrieving the list of available wireless channels from the display device through the plug-and-play communication interface.

11. A computing device, comprising:

a communication interface configured to enable communications between the computing device, a wireless communication device, and a proximity device; and at least one processor coupled to the communication interface and configured to:

initialize a network driver of the computing device;

establish a first connection with the proximity device, wherein the proximity device is powered before the computing device;

retrieve, from the proximity device, a list of available wireless channels to communicate with the wireless communication device, wherein the list of available wireless channels is stored on the proximity device and selected from a list of WiFi wireless channels provided by the wireless communication device; and establish a second connection with the wireless communication device through a streaming channel selected from the list of available wireless channels.

12. The computing device of claim 11, wherein the list of available wireless channels is determined by the proximity device within a predetermined time duration before powering on the computing device.

13. The computing device of claim 11, wherein the computing device is a plug-and-play device that is coupled to a display device by a plug-and-play communication interface.

14. The computing device of claim 13, wherein the plug-and-play communication interface includes a universal serial bus (USB) interface or a High-Definition Multimedia Interface (HDMI).

15. The computing device of claim 11, wherein the proximity device is a remote control, and to establish the first connection, the at least one processor is configured to establish the first connection through a default peer-to-peer wireless communication channel between the computing device and the remote control.

16. A non-transitory computer-readable medium having instructions stored thereon that, when executed by at least a computing device, cause the computing device to perform operations comprising:

initializing a network driver of the computing device;

establishing a first connection with a proximity device, wherein the proximity device is powered before the computing device;

retrieving, from the proximity device, a list of available wireless channels to communicate with a wireless communication device, wherein the list of available wireless channels is stored on the proximity device and selected from a list of WiFi wireless channels provided by the wireless communication device; and establishing a second connection with the wireless communication device through a streaming channel selected from the list of available wireless channels.

17. The non-transitory computer-readable medium of claim 16, wherein the proximity device is a remote control, and the establishing the first connection comprises establishing the first connection through a default peer-to-peer wireless communication channel between the computing device and the remote control.

18. The non-transitory computer-readable medium of claim 16, wherein the proximity device is a display device coupled to the computing device by a plug-and-play communication interface, and wherein the establishing the first connection with the proximity device comprises:

establishing the first connection with the proximity device through the plug-and-play communication interface; and retrieving the list of available wireless channels from the display device through the plug-and-play communication interface.

19. The non-transitory computer-readable medium of claim 16, wherein the operations further comprise at least one or more operations selected from:

starting an operating system of the computing device;

starting a network application for the computing device before initializing the network driver; and selecting the streaming channel from the list of available wireless channels retrieved from the proximity device.

20. The non-transitory computer-readable medium of claim 16, wherein the operations further comprise:

connecting the computing device to a display device by a plug-and-play communication interface; and receiving a signal indicating a button of the computing device being pressed to switch on the computing device by power provided from the display device through the plug-and-play communication interface.

* * * * *